US011914657B2

(12) United States Patent
Kewalramani et al.

(10) Patent No.: US 11,914,657 B2
(45) Date of Patent: Feb. 27, 2024

(54) MACHINE LEARNING AIDED AUTOMATIC TAXONOMY FOR WEB DATA

(71) Applicant: 6SENSE INSIGHTS, INC., San Francisco, CA (US)

(72) Inventors: Rohit Kewalramani, Pune (IN); Justin Chien, Campbell, CA (US)

(73) Assignee: 6SENSE INSIGHTS, INC., San Francisco, CA (US)

( * ) Notice: Subject to any disclaimer, the term of this patent is extended or adjusted under 35 U.S.C. 154(b) by 93 days.

(21) Appl. No.: 17/828,910

(22) Filed: May 31, 2022

(65) Prior Publication Data

US 2022/0391453 A1 Dec. 8, 2022

Related U.S. Application Data

(60) Provisional application No. 63/195,566, filed on Jun. 1, 2021.

(51) Int. Cl.

| | |
|---|---|
| ***G06F 16/00*** | (2019.01) |
| ***G06F 16/951*** | (2019.01) |
| ***G06N 3/04*** | (2023.01) |
| ***G06N 3/082*** | (2023.01) |
| ***G06F 40/205*** | (2020.01) |

(52) U.S. Cl.

CPC .......... *G06F 16/951* (2019.01); *G06F 40/205* (2020.01); *G06N 3/04* (2013.01); *G06N 3/082* (2013.01)

(58) Field of Classification Search

CPC ....... G06F 16/951; G06F 40/205; G06N 3/04; G06N 3/082

See application file for complete search history.

(56) References Cited

U.S. PATENT DOCUMENTS

| | | | |
|---|---|---|---|
| 2010/0023506 | A1 | 1/2010 | Sahni et al. |
| 2011/0119208 | A1* | 5/2011 | Kirshenbaum .......... G06N 5/02 706/54 |
| 2011/0276396 | A1* | 11/2011 | Rathod .............. G06Q 30/0282 707/706 |
| 2012/0158685 | A1 | 6/2012 | White et al. |
| 2013/0346376 | A1 | 12/2013 | Dmitriev et al. |
| 2017/0180497 | A1* | 6/2017 | Comstock ............... H04L 67/02 |
| 2019/0108282 | A1 | 4/2019 | Zeng et al. |
| 2019/0325259 | A1* | 10/2019 | Murphy .............. G06F 18/2148 |
| 2020/0218750 | A1 | 7/2020 | Liu |
| 2021/0406601 | A1* | 12/2021 | Narlikar .................. G06F 16/45 |

OTHER PUBLICATIONS

International Search Report/Written Opinion in corresponding PCT/US2022/35165, 10 pgs, dated Oct. 27, 2022,.

* cited by examiner

*Primary Examiner* — Leslie Wong
(74) *Attorney, Agent, or Firm* — Procopio, Cory, Hargreaves & Savitch LLP

(57) ABSTRACT

Machine-learning-aided automatic taxonomy for web data. In an embodiment, a training dataset of annotated features is used to train a model to predict a class in a taxonomy of web-based activities. The features may be derived from a uniform resource locator (URL) of an online resource and associated metadata. During operation, the features may be extracted from the URL and metadata of each activity record in web data. The trained model may be applied to the extracted features for each activity record to predict a class within the taxonomy. The predicted taxonomic class may be stored in association with the URL that was extracted from the activity record to produce a taxonomized URL.

20 Claims, 6 Drawing Sheets

300

355

650

MACHINE LEARNING AIDED AUTOMATIC TAXONOMY FOR WEB DATA

CROSS-REFERENCE TO RELATED APPLICATIONS

This application claims priority to U.S. Provisional Patent App. No. 63/195,566, filed on Jun. 1, 2021, which is hereby incorporated herein by reference as if set forth in full. In addition, this application is related to U.S. Pat. No. 9,202,227, issued on Dec. 1, 2015, U.S. Pat. No. 10,475,056, issued on Nov. 12, 2019, U.S. Pat. No. 10,536,427, issued on Jan. 14, 2020, U.S. Pat. No. 10,873,560, issued on Dec. 22, 2020, U.S. patent application Ser. No. 17/362,605, filed on Jun. 29, 2021, U.S. patent application Ser. No. 17/362,646, filed on Jun. 29, 2021, and U.S. application Ser. No. 17/362,843, filed on Jun. 29, 2021, which are all hereby incorporated herein by reference as if set forth in full.

BACKGROUND

Field of the Invention

The embodiments described herein are generally directed to artificial intelligence (AI), and, more particularly, to machine-learning-aided automatic taxonomy for web data.

Description of the Related Art

Different systems, such as marketing automation platforms (MAPs), customer relationship management (CRM) systems, and websites, organize records differently. Thus, a platform that receives data from these different systems, as data sources, must utilize a taxonomy to aggregate records from these data sources. A taxonomy maps data from different data sources into a common and consistent labeling system to ensure compatibility with downstream functions. Without a taxonomy, the downstream functions would be unable to understand the data.

Conventionally, the creation of a taxonomy requires a labor-intensive collaborative process between the data aggregator and each of the data sources. The data aggregator must understand the structure of the data in order to build a taxonomy that maps the data to standardized fields for use with downstream functions. Due to various obstacles to automation, such as scalability and repeatability, this process must traditionally be performed manually. Not only does such a process cost a vast amount of time and effort, but it allows the introduction of a significant amount of human error.

Thus, what is needed is a solution to the obstacles preventing automation of the process for building a taxonomy, and particularly, in the context of web data.

SUMMARY

Accordingly, systems, methods, and non-transitory computer-readable media are disclosed for a machine-learning-aided automatic taxonomy for web data.

In an embodiment, a method comprises using at least one hardware processor to: during a training mode, train a model to predict a class, from a plurality of classes in a taxonomy of web-based activities, based on a training dataset that comprises a plurality of annotated features, wherein each of the plurality of annotated features comprises one or more features, which have been derived from a uniform resource locator (URL) of an online resource and metadata associated with that online resource, and a ground-truth class assigned to those one or more features; and, during an operation mode, acquire web data comprising one or more activity records, wherein each of the one or more activity records comprises a URL of an online resource that was accessed by a visitor, and metadata associated with that online resource, and, for each of the one or more activity records, extract a set of one or more features from the UR and the metadata in the activity record, apply the trained model to the set of one or more features to predict a class, from the plurality of classes in the taxonomy, that is associated with the set of one or more features, and store the predicted class in association with the URL in the activity record.

Extracting a set of one or more features from the URL and the metadata may comprise: deriving one or more keywords from the URL and the metadata; and converting the one or more keywords into a vector according to a vectorization function. The vector may have a fixed number of dimensions and represent an embedding of the one or more keywords within a vector space having the fixed number of dimensions. The vectorization function may be a language transformer. The vector may comprise a real value for each of the fixed number of dimensions. Extracting a set of one or more features from the URL may comprise: parsing the URL into a plurality of components; and deriving one or more keywords to be included in the set of one or more features based on at least one pattern in the plurality of components. Extracting a set of one or more features from the URL may further comprise, after parsing the URL and before deriving one or more keywords, pre-processing the plurality of components to normalize text in the plurality of components. Deriving one or more keywords to be included in the set of one or more features may comprise adding a subdomain in the plurality of components to the set of one or more features only when one or more other ones of the plurality of components are empty. Deriving one or more keywords to be included in the set of one or more features may comprise adding a keyword indicating a search to the set of one or more features when a search pattern is present in the plurality of components. Deriving one or more keywords to be included in the set of one or more features may comprise adding a keyword indicating a company name to the set of one or more features when a homepage pattern is present in the plurality of components.

Extracting a set of one or more features from the metadata may comprise extracting character strings from one or more fields in the metadata without including duplicate character strings in the set of one or more features. The model may comprise a deep neural network. Training the model may comprise adding one or more layers to an existing neural network trained for natural language processing, while neuron weights in one or more layers of the existing neural network are frozen. The trained model may output both the predicted class and a probability value for the predicted class, wherein the method further comprises using the at least one hardware processor to, during the operation mode, for each of the one or more activity records: when the probability value for the predicted class satisfies a threshold, assign a mapped status to the URL in the activity record; and, when the probability value for the predicted class does not satisfy the threshold, assign an unmapped status to the URL in the activity record. The method may further comprise using the at least one hardware processor to: generate a graphical user interface that comprises, for each of the URLs to which the unmapped status has been assigned, one or more inputs for specifying one of the plurality of classes in the taxonomy to be associated with that URL; and, in response to receiving a specification of one of the plurality of classes in the taxonomy to be associated with one of the URLs to which the unmapped status has been assigned, store the specified class in association with the one URL, and switch the unmapped status to the mapped status.

The method may further comprise using the at least one hardware processor to generate a graphical user interface that comprises one or more inputs for changing any one or more of the stored predicted classes that are associated with the URLs in the activity records to overriding classes, and at least one input for storing any overriding classes and any non-overridden predicted classes in association with their respective URLs in a data warehouse. The method may further comprise using the at least one hardware processor to generate a lookup table from the data warehouse, wherein the lookup table indexes classes in the data warehouse by URLs associated with those classes in the data warehouse. The method may further comprise using the at least one hardware processor to, for each of the one or more activity records: prior to extracting the set of one or more features, perform a lookup in the lookup table using the URL in the activity record; when the lookup returns a class, store the class in association with the URL in the activity record without extracting the set of one or more features and without applying the trained model; and, when the lookup does not return a class, extract the set of one or more features and apply the trained model.

Any of the methods above may be embodied, individually or in any combination, in executable software modules of a processor-based system, such as a server, and/or in executable instructions stored in a non-transitory computer-readable medium.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

In an embodiment, systems, methods, and non-transitory computer-readable media are disclosed for a machine-learning-aided automatic taxonomy for web data. After reading this description, it will become apparent to one skilled in the art how to implement the invention in various alternative embodiments and alternative applications. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

1. System Overview 1.1. Infrastructure

Figure 1:
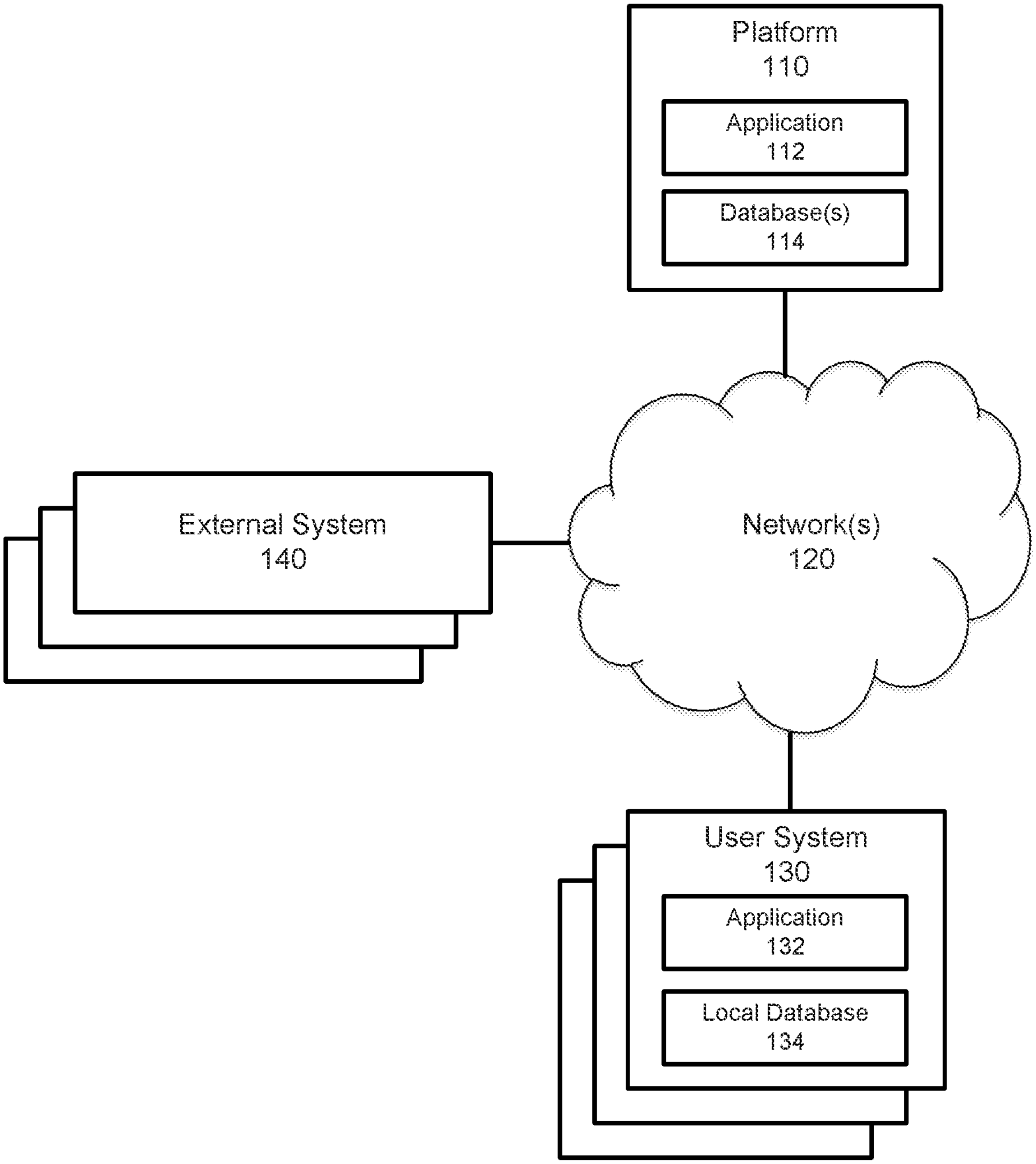
FIG. 1 illustrates an example infrastructure, in which one or more of the processes described herein, may be implemented, according to an embodiment.

FIG. 1 illustrates an example infrastructure in which one or more of the disclosed processes may be implemented, according to an embodiment. The infrastructure may comprise a platform 110 (e.g., one or more servers) which hosts and/or executes one or more of the various functions, processes, methods, and/or software modules described herein. Platform 110 may comprise dedicated hardware servers, or may instead comprise cloud servers, which utilize shared resources of one or more hardware servers. In any case, these servers may be collocated and/or geographically distributed. Platform 110 may also comprise or be communicatively connected to a server application 112 and/or one or more databases 114. In addition, platform 110 may be communicatively connected to one or more user systems 130 via one or more networks 120. Platform 110 may also be communicatively connected to one or more external systems 140 (e.g., other platforms, websites, etc.) via one or more networks 120.

Network(s) 120 may comprise the Internet, and platform 110 may communicate with user system(s) 130 through the Internet using standard transmission protocols, such as HyperText Transfer Protocol (HTTP), HTTP Secure (HTTPS), File Transfer Protocol (FTP), FTP Secure (FTPS), Secure Shell FTP (SFTP), and the like, as well as proprietary protocols. While platform 110 is illustrated as being connected to various systems through a single set of network(s) 120, it should be understood that platform 110 may be connected to the various systems via different sets of one or more networks. For example, platform 110 may be connected to a subset of user systems 130 and/or external systems 140 via the Internet, but may be connected to one or more other user systems 130 and/or external systems 140 via an intranet. Furthermore, while only a few user systems 130 and external systems 140, one server application 112, and one set of database(s) 114 are illustrated, it should be understood that the infrastructure may comprise any number of user systems, external systems, server applications, and databases.

User system(s) 130 may comprise any type or types of computing devices capable of wired and/or wireless communication, including without limitation, desktop computers, laptop computers, tablet computers, smart phones or other mobile phones, servers, game consoles, televisions, set-top boxes, electronic kiosks, point-of-sale terminals, and/or the like. It is generally contemplated that user system(s) 130 would comprise desktop computers, workstations, and/or mobile devices that users typically utilize during performance of their normal job responsibilities for an employer. Each user may utilize their personal user system 130 to create and/or access a user account with platform 110 that enables them to authenticate with and access the functions of platforms 110 (e.g., as implemented in server application 112), for which the user has an appropriate role or permissions, during a secure session.

Platform 110 may comprise web servers which host one or more websites and/or web services. In embodiments in which a website is provided, the website may comprise a graphical user interface, including, for example, one or more screens (e.g., webpages) generated in HyperText Markup Language (HTML) or other language. Platform 110 transmits or serves one or more screens of the graphical user interface in response to requests from user system(s) 130. In some embodiments, these screens may be served in the form of a wizard, in which case two or more screens may be served in a sequential manner, and one or more of the sequential screens may depend on an interaction of the user or user system 130 with one or more preceding screens. The requests to platform 110 and the responses from platform 110, including the screens of the graphical user interface, may both be communicated through network(s) 120, which may include the Internet, using standard communication protocols (e.g., HTTP, HTTPS, etc.). These screens (e.g., webpages) may comprise a combination of content and elements, such as text, images, videos, animations, references (e.g., hyperlinks), frames, inputs (e.g., textboxes, text areas, checkboxes, radio buttons, drop-down menus, buttons, forms, etc.), scripts (e.g., JavaScript), and the like, including elements comprising or derived from data stored in one or more databases (e.g., database(s) 114) that are locally and/or remotely accessible to platform 110. Platform 110 may also respond to other requests from user system(s) 130.

Platform 110 may further comprise, be communicatively coupled with, or otherwise have access to one or more database(s) 114. For example, platform 110 may comprise one or more database servers which manage one or more databases 114. A user system 130 or server application 112 executing on platform 110 may submit data (e.g., user data, form data, etc.) to be stored in database(s) 114, and/or request access to data stored in database(s) 114. Any suitable database may be utilized, including without limitation MySQL™, Oracle™ IBM™, Microsoft SQL™, Access™, PostgreSQL™, and the like, including cloud-based databases and proprietary databases. Data may be sent to platform 110, for instance, using the well-known POST request supported by HTTP, via FTP, and/or the like. This data, as well as other requests, may be handled, for example, by server-side web technology, such as a servlet or other software module (e.g., comprised in server application 112), executed by platform 110.

In embodiments in which a web service is provided, platform 110 may receive requests from external system(s) 140, and provide responses in eXtensible Markup Language (XML), JavaScript Object Notation (JSON), and/or any other suitable or desired format. In such embodiments, platform 110 may provide an application programming interface (API) which defines the manner in which user system(s) 130 and/or external system(s) 140 may interact with the web service. Thus, user system(s) 130 and/or external system(s) 140 (which may themselves be servers), can define their own user interfaces, and rely on the web service to implement or otherwise provide the backend processes, methods, functionality, storage, and/or the like, described herein. For example, in such an embodiment, a client application 132, executing on one or more user system(s) 130 and potentially using a local database 134, may interact with a server application 112 executing on platform 110 to execute one or more or a portion of one or more of the various functions, processes, methods, and/or software modules described herein. In an embodiment, client application 132 may utilize a local database 134 for storing data locally on user system 130. Client application 132 may be "thin," in which case processing is primarily carried out server-side by server application 112 on platform 110. A basic example of a thin client application 132 is a browser application, which simply requests, receives, and renders webpages at user system(s) 130, while server application 112 on platform 110 is responsible for generating the webpages and managing database functions. Alternatively, the client application may be "thick," in which case processing is primarily carried out client-side by user system(s) 130. It should be understood that client application 132 may perform an amount of processing, relative to server application 112 on platform 110, at any point along this spectrum between "thin" and "thick," depending on the design goals of the particular implementation. In any case, the software described herein, which may wholly reside on either platform 110 (e.g., in which case server application 112 performs all processing) or user system(s) 130 (e.g., in which case client application 132 performs all processing) or be distributed between platform 110 and user system(s) 130 (e.g., in which case server application 112 and client application 132 both perform processing), can comprise one or more executable software modules comprising instructions that implement one or more of the processes, methods, or functions described herein.

1.2. Example Processing Device

Figure 2:
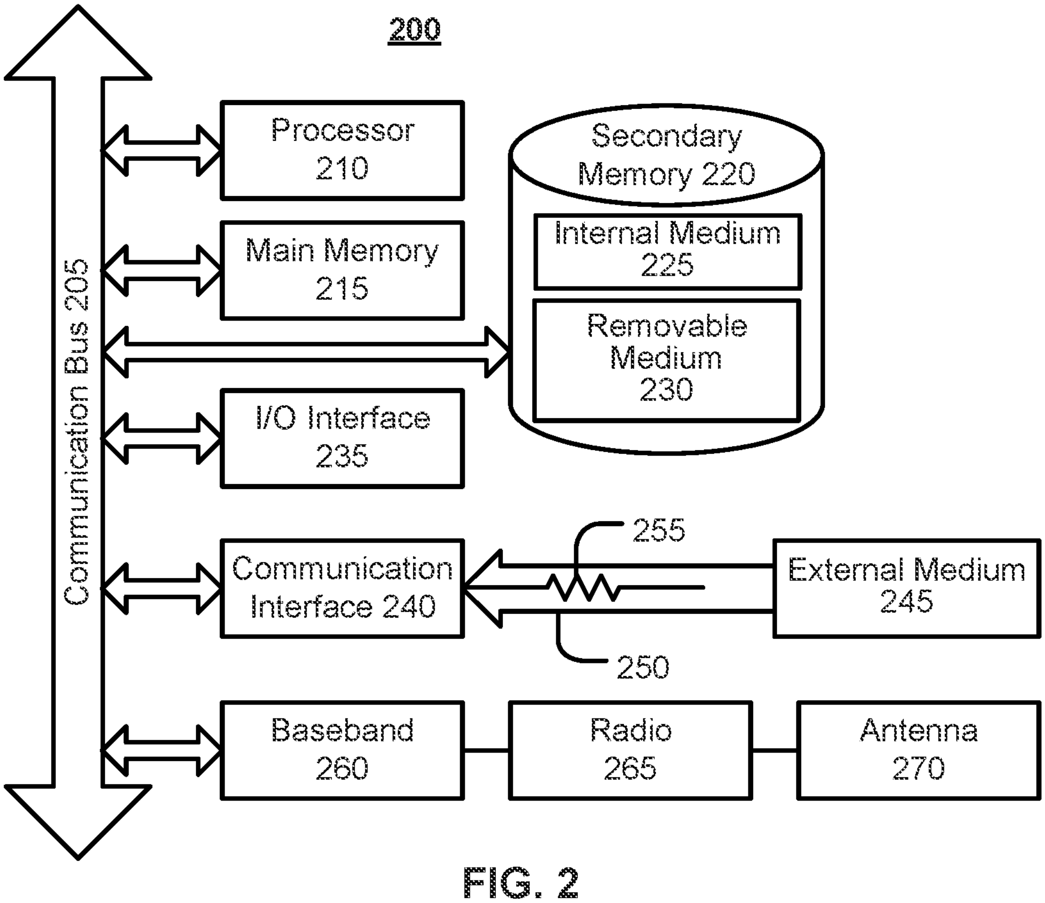
FIG. 2 illustrates an example processing system, by which one or more of the processes described herein, may be executed, according to an embodiment.

FIG. 2 is a block diagram illustrating an example wired or wireless system 200 that may be used in connection with various embodiments described herein. For example, system 200 may be used as or in conjunction with one or more of the functions, processes, or methods (e.g., to store and/or execute the software) described herein, and may represent components of platform 110, user system(s) 130, external system(s) 140, and/or other processing devices described herein. System 200 can be a server or any conventional personal computer, or any other processor-enabled device that is capable of wired or wireless data communication. Other computer systems and/or architectures may be also used, as will be clear to those skilled in the art.

System 200 preferably includes one or more processors 210. Processor(s) 210 may comprise a central processing unit (CPU). Additional processors may be provided, such as a graphics processing unit (GPU), an auxiliary processor to manage input/output, an auxiliary processor to perform floating-point mathematical operations, a special-purpose microprocessor having an architecture suitable for fast execution of signal-processing algorithms (e.g., digital-signal processor), a secondary processor subordinate to the main processing system (e.g., backend processor), an additional microprocessor or controller for dual or multiple processor systems, and/or a coprocessor. Such auxiliary processors may be discrete processors or may be integrated with processor 210. Examples of processors which may be used with system 200 include, without limitation, any of the processors (e.g., Pentium™, Core i7™, Xeon™, etc.) available from Intel Corporation of Santa Clara, California, any of the processors available from Advanced Micro Devices, Incorporated (AMD) of Santa Clara, California, any of the processors (e.g., A series, M series, etc.) available from Apple Inc. of Cupertino, any of the processors (e.g., Exynos™) available from Samsung Electronics Co., Ltd., of Seoul, South Korea, and/or the like.

Processor 210 is preferably connected to a communication bus 205. Communication bus 205 may include a data channel for facilitating information transfer between storage and other peripheral components of system 200. Furthermore, communication bus 205 may provide a set of signals used for communication with processor 210, including a data bus, address bus, and/or control bus (not shown). Communication bus 205 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPM), IEEE 696/S-100, and/or the like.

System 200 preferably includes a main memory 215 and may also include a secondary memory 220. Main memory 215 provides storage of instructions and data for programs executing on processor 210, such as one or more of the functions and/or modules discussed herein. It should be understood that programs stored in the memory and executed by processor 210 may be written and/or compiled according to any suitable language, including without limitation C/C++, Java, JavaScript, Perl, Visual Basic, .NET, and the like. Main memory 215 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Secondary memory 220 may optionally include an internal medium 225 and/or a removable medium 230. Removable medium 230 is read from and/or written to in any well-known manner. Removable storage medium 230 may be, for example, a magnetic tape drive, a compact disc (CD) drive, a digital versatile disc (DVD) drive, other optical drive, a flash memory drive, and/or the like. Secondary memory 220 is a non-transitory computer-readable medium having computer-executable code (e.g., disclosed software modules) and/or other data stored thereon. The computer software or data stored on secondary memory 220 is read into main memory 215 for execution by processor 210. In alternative embodiments, secondary memory 220 may include other similar means for allowing computer programs or other data or instructions to be loaded into system 200. Such means may include, for example, a communication interface 240, which allows software and data to be transferred from external storage medium 245 to system 200. Examples of external storage medium 245 may include an external hard disk drive, an external optical drive, an external magneto-optical drive, and/or the like. Other examples of secondary memory 220 may include semiconductor-based memory, such as programmable read-only memory (PROM), erasable programmable read-only memory (EPROM), electrically erasable read-only memory (EEPROM), and flash memory (block-oriented memory similar to EEPROM).

As mentioned above, system 200 may include a communication interface 240. Communication interface 240 allows software and data to be transferred between system 200 and external devices (e.g. printers), networks, or other information sources. For example, computer software or executable code may be transferred to system 200 from a network server (e.g., platform 110) via communication interface 240. Examples of communication interface 240 include a built-in network adapter, network interface card (NIC), Personal Computer Memory Card International Association (PCMCIA) network card, card bus network adapter, wireless network adapter, Universal Serial Bus (USB) network adapter, modem, a wireless data card, a communications port, an infrared interface, an IEEE 1394 fire-wire, and any other device capable of interfacing system 200 with a network (e.g., network(s) 120) or another computing device. Communication interface 240 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 240 are generally in the form of electrical communication signals 255. These signals 255 may be provided to communication interface 240 via a communication channel 250. In an embodiment, communication channel 250 may be a wired or wireless network (e.g., network(s) 120), or any variety of other communication links. Communication channel 250 carries signals 255 and can be implemented using a variety of wired or wireless communication means including wire or cable, fiber optics, conventional phone line, cellular phone link, wireless data communication link, radio frequency ("RF") link, or infrared link, just to name a few.

Computer programs (e.g., computer-executable code implementing the disclosed software) are stored in main memory 215 and/or secondary memory 220. Computer programs can also be received via communication interface 240 and stored in main memory 215 and/or secondary memory 220. Such computer programs, when executed, enable system 200 to perform the various functions of the disclosed embodiments as described elsewhere herein.

As used herein, the term "computer-readable medium" is used to refer to any non-transitory computer-readable storage media used to provide computer-executable code and/or other data to or within system 200. Examples of such media include main memory 215, secondary memory 220 (including internal memory 225, removable medium 230, and external storage medium 245), and any peripheral device communicatively coupled with communication interface 240 (including a network information server or other network device). These non-transitory computer-readable media are means for providing executable code, programming instructions, software, and/or other data to system 200.

In an embodiment that is implemented using software, the software may be stored on a computer-readable medium and loaded into system 200 by way of removable medium 230, I/O interface 235, or communication interface 240. In such an embodiment, the software is loaded into system 200 in the form of electrical communication signals 255. The software, when executed by processor 210, preferably causes processor 210 to perform one or more of the processes and functions described elsewhere herein.

In an embodiment, I/O interface 235 provides an interface between one or more components of system 200 and one or more input and/or output devices. Example input devices include, without limitation, sensors, keyboards, touch screens or other touch-sensitive devices, cameras, biometric sensing devices, computer mice, trackballs, pen-based pointing devices, and/or the like. Examples of output devices include, without limitation, other processing devices, printers, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and/or the like. In some cases, an input and output device may be combined, such as in the case of a touch panel display (e.g., in a smartphone, tablet, or other mobile device).

System 200 may also include optional wireless communication components that facilitate wireless communication over a voice network and/or a data network (e.g., in the case of user system 130). The wireless communication components comprise an antenna system 270, a radio system 265, and a baseband system 260. In system 200, radio frequency (RF) signals are transmitted and received over the air by antenna system 270 under the management of radio system 265.

In an embodiment, antenna system 270 may comprise one or more antennae and one or more multiplexors (not shown) that perform a switching function to provide antenna system 270 with transmit and receive signal paths. In the receive path, received RF signals can be coupled from a multiplexor to a low noise amplifier (not shown) that amplifies the received RF signal and sends the amplified signal to radio system 265.

In an alternative embodiment, radio system 265 may comprise one or more radios that are configured to communicate over various frequencies. In an embodiment, radio system 265 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from radio system 265 to baseband system 260.

If the received signal contains audio information (e.g., for a user system comprising a smartphone), then baseband system 260 decodes the signal and converts it to an analog signal. Then the signal is amplified and sent to a speaker. Baseband system 260 also receives analog audio signals from a microphone. These analog audio signals are converted to digital signals and encoded by baseband system 260. Baseband system 260 also encodes the digital signals for transmission and generates a baseband transmit audio signal that is routed to the modulator portion of radio system 265. The modulator mixes the baseband transmit audio signal with an RF carrier signal, generating an RF transmit signal that is routed to antenna system 270 and may pass through a power amplifier (not shown). The power amplifier amplifies the RF transmit signal and routes it to antenna system 270, where the signal is switched to the antenna port for transmission.

Baseband system 260 is also communicatively coupled with processor(s) 210. Processor(s) 210 may have access to data storage areas 215 and 220. Processor(s) 210 are preferably configured to execute instructions (i.e., computer programs, such as the disclosed software) that can be stored in main memory 215 or secondary memory 220. Computer programs can also be received from baseband processor 260 and stored in main memory 210 or in secondary memory 220, or executed upon receipt. Such computer programs, when executed, may enable system 200 to perform the various functions of the disclosed embodiments.

2. Process Overview

Embodiments of processes for a machine-learning-aided automatic taxonomy for web data will now be described in detail. It should be understood that the described processes may be embodied in one or more software modules that are executed by one or more hardware processors (e.g., processor 210), for example, as a software application (e.g., server application 112, client application 132, and/or a distributed application comprising both server application 112 and client application 132), which may be executed wholly by processor(s) of platform 110, wholly by processor(s) of user system(s) 130, or may be distributed across platform 110 and user system(s) 130, such that some portions or modules of the software application are executed by platform 110 and other portions or modules of the software application are executed by user system(s) 130. The described processes may be implemented as instructions represented in source code, object code, and/or machine code. These instructions may be executed directly by hardware processor(s) 210, or alternatively, may be executed by a virtual machine operating between the object code and hardware processors 210. In addition, the disclosed software may be built upon or interfaced with one or more existing systems.

Alternatively, the described processes may be implemented as a hardware component (e.g., general-purpose processor, integrated circuit (IC), application-specific integrated circuit (ASIC), digital signal processor (DSP), field-programmable gate array (FPGA) or other programmable logic device, discrete gate or transistor logic, etc.), combination of hardware components, or combination of hardware and software components. To clearly illustrate the interchangeability of hardware and software, various illustrative components, blocks, modules, circuits, and steps are described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a component, block, module, circuit, or step is for ease of description. Specific functions or steps can be moved from one component, block, module, circuit, or step to another without departing from the invention.

Furthermore, while the processes, described herein, are illustrated with a certain arrangement and ordering of subprocesses, each process may be implemented with fewer, more, or different subprocesses and a different arrangement and/or ordering of subprocesses. In addition, it should be understood that any subprocess, which does not depend on the completion of another subprocess, may be executed before, after, or in parallel with that other independent subprocess, even if the subprocesses are described or illustrated in a particular order.

Figure 3:
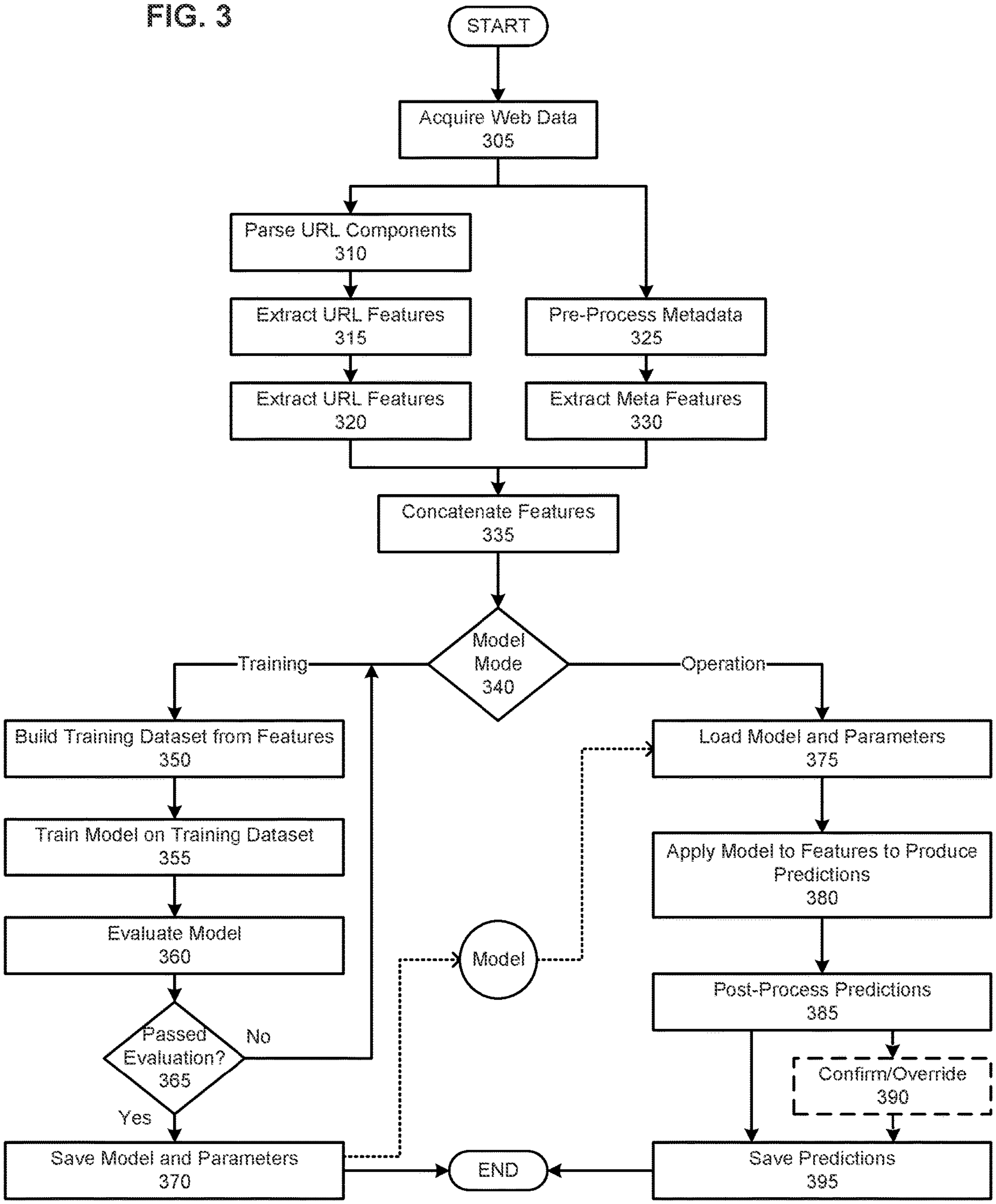
FIG. 3 illustrates a process for automating a taxonomy for web data, according to an embodiment.

FIG. 3 illustrates a process 300 for automating a taxonomy for web data, including both the training and operation modes of a prediction model, according to an embodiment. In an embodiment, process 300 is implemented by server application 112 on platform 110. However, in alternative embodiments, process 300 could be implemented by client application 132 on user system 130, or as a distributed software application with some subprocesses implemented by server application 112 and other subprocesses implemented by client application 132. In any case, process 300 may be performed iteratively or periodically (e.g., daily), in real time as web data is received, after a certain amount of web data is received, in response to a user operation, and/or the like.

In subprocess 305, web data, comprising one or a plurality of activity records, are received or otherwise acquired. The web data may be acquired from one or more external systems 140. For example, the web data may be received from a marketing automation platform (MAP), a customer relationship management (CRM) system, an external website, and/or the like. In particular, an external system 140 may track engagement with online resources, such as webpages, and store these engagements as activity records. In an embodiment, a beacon may be stored and executed on a website hosted by the external system 140 to track the activities and IP addresses of visitors to the website and store the tracked data as activity records. The external system 140 may then communicate these activity records to platform 110 over network(s) 120. For example, the external system 140 may "push" the activity records to platform 110 via an API of platform 110. Alternatively, platform 110 may "pull" the activity records from the external system 140 via an API of the external system 140. As another alternative, the activity records may be manually uploaded to platform 110 by a user through a user account registered with platform 110. In any case, the activity records may represent online activities, such as visits to a webpage of a website (e.g., homepage, company page, product page, discussion forum, search page, careers page, etc.), clicking a hyperlink (e.g., in an email message of a marketing campaign), submissions of online forms on websites (e.g., search query, contact form, request for a price quote for a product, job submission, tradeshow registration, product trial, etc.), downloads of electronic documents from websites (e.g., white paper, etc.), playback of media (e.g., videos, webinars, demonstrations, etc.) on websites, subscription or un-subscription from a news or other media feed, and/or the like.

Figure 4:
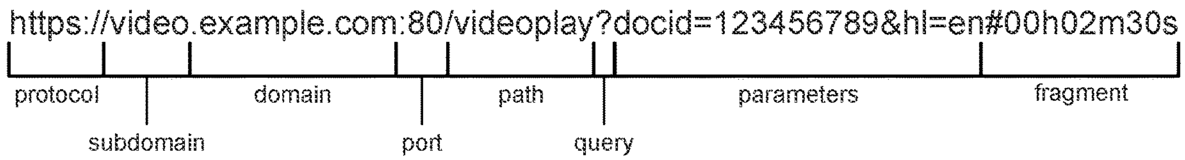
FIG. 4 illustrates components of an example uniform resource locator (URL), according to an embodiment.

Each activity record may comprise a uniform resource locator (URL), representing the online resource which was accessed as the activity. FIG. 4 illustrates the components of an example URL, according to an embodiment. In particular, the example URL comprises, in sequence from left to right, a protocol (e.g., HTTP, HTTPS, FTP, etc.), a subdomain, a domain, a port, a path, a query, one or more parameters, and/or one or more fragments. It should be understood that not every URL contains all of these components. Rather, a given URL may comprise one or more of the components. However, generally, every URL will contain at least a protocol and a domain name, depending on the quality of the data. Any of the other components, including the subdomain, port, path, query, parameter(s), and fragment may or may not be present in a given URL depending on the online resource identified by the URL.

Each activity record may also comprise metadata associated with the URL in that activity record. In an embodiment in which the activity records are communicated from an external system 140, the metadata may be included in the native activity records from the external system 140. Alternatively, the metadata may be added (e.g., by server application 112 on platform 110) after receiving the activity records from the external system 140, based on the URLs in the activity records. For example, the metadata for each URL may be scraped by a web-crawler that accesses each URL. In particular, when the URL is a webpage, natural language processing may be used to analyze the visible and embedded text of the webpage in order to derive the metadata. This analysis may comprise extracting fields (e.g., title, description, keywords, metatags, etc.) from the webpage (e.g., including content, as well as non-content embedded in the source code), counting frequency statistics for words in the text, calculating word densities based on sentences, calculating sentence density based on paragraphs, and/or the like. This analysis may also utilize computer vision to identify paragraphs and continuous text contours. The metadata may then be added to the activity record to enhance the activity record with more information about the URL.

Regardless of how it is obtained, the metadata may comprise a plurality of fields, including, without limitation, a title of the online resource at the respective URL, a description of the online resource at the respective URL, keyword(s) associated with the online resource at the respective URL, event attributes (e.g., HTML event attributes) associated with the access of the online resource at the respective URL, and/or metatag(s) associated with the online resource at the respective URL. Using the example of a webpage as the online resource at the respective URL, the title is a character string that is generally displayed as a heading on the browser tab when the webpage is viewed in a browser. The description is a character string that is generally embedded in the source code (e.g., HTML) of the webpage, may or may not be visible when the webpage is viewed in the browser, and is often used for search engine discovery and optimization. Keywords and metatags are similar to the description, but are generally embedded in the source code of the webpage as words or phrases, rather than prose, and are typically not visible when the webpage is viewed in the browser. Keywords and metatags are used for search engine discovery and optimization. Event attributes represent events that occurred while the webpage was being viewed in the browser. Those events generally represent a viewer's interactions with the webpage (e.g., in the case of HTML event attributes, onmouseover, onclick, onsubmit, onfocus, etc.).

Regardless of how the web data is constructed or otherwise acquired, it may comprise a plurality of activity records that each comprise a URL and metadata associated with the online resource at that URL. In embodiments in which the web data is processed periodically (e.g., daily) or in response to a user operation, the web data may be stored in a data warehouse (e.g., in database 114 on platform 110) until the time at which it is processed. Thus, web data may be collected and processed in batches. The collection and processing may be performed independently on web data collected for each individual user account with platform 110 or may be performed collectively on aggregate web data collected for a plurality of user accounts with platform 110. When the web data is to be processed, the web data may be retrieved from the data warehouse and processed by subprocesses 310 and 320. As illustrated, subprocesses 310 and 320 are independent from each other, and therefore, may be performed in parallel or serially.

As discussed above, the web data may comprise a plurality of activity records that each comprises a URL of an online resource that was accessed and metadata about that online resource and/or the access of and/or interactions with that online resource. Subprocess 310 operates on the URL in each of the activity records in the web data. In particular, subprocess 310 may parse each URL to separate the URL into separate and distinct components (e.g., protocol, subdomain, domain, port, path, query, parameters, and/or fragment), and provide each of these URL components to subprocess 315 for further processing. Not all of the URL components may be provided to subprocess 315 for further processing. For example, in an embodiment, only the subdomain, path, query, parameter(s), and fragment(s) are provided to subprocess 315 for further processing. The other URL components may be excluded from this further processing.

In subprocess 315, the URL components are pre-processed. This pre-processing may comprise cleaning or normalizing the text of the URL components, including removing syntactical impurities within the text of each URL component. For example, the pre-processing may include, without limitation, one or more, including potentially all, of the following steps for each of the URL components:

Expanding English contractions in the URL component. For example, the contraction "hasn't" may be expanded to "has not", the contraction "I'd" may be expanded to "I would", and the like.

Expanding words in camel case in the URL component. For example, the term "loginPage" may be expanded to "login Page", the term "helloWorld" may be expanded to "hello World", and the like.

Expanding acronyms.

Removing unwanted characters from the URL component. For example, characters, such as "/", "*", "&", "%", "$", "#", and the like, may be removed.

Removing commonly used or "stop" words from the URL component. For example, words, such as "the", "for", "an", "and", and the like, may be removed.

Removing business-identified specific words and/or generic stop words from the URL component. For example, terms, such as "bmw", "cad", "ptc", and the like, may be removed as business-identified specific words. Terms, such as "html", "www", "aspx", and the like, may be removed as generic stop words.

Removing pure numbers from the URL component.

Removing cookie strings, hash strings, or similar data from the URL component. For example, any string of arbitrary characters, such as "dd3i4837Hg7268t %$$#6234", may be removed.

Removing words containing less than three characters.

Removing excess spaces and tabs.

Applying lowercase to all characters.

As a result of the pre-processing steps in subprocess 315, the URL components for all of the URLs in all of the activity records are normalized. The pre-processing steps should be performed in the same sequence for the URL components in all of the activity records, since the sequence in which the pre-processing steps are performed may directly influence the performance of the model. It should also be understood that not all of the pre-processing steps will apply to all URL components, since there is significant diversity in the text patterns of URLs.

For each URL in each activity record, after all of the URL components have been normalized for that URL by subprocess 315, subprocess 320 extracts the URL features from the normalized URL components for that URL. It should be understood that the features may represent important pattern(s) and/or structure(s). The extracted features may be represented collectively as a feature string comprising one or more keywords. Examples of special cases of features that may be extracted include, without limitation, one or more, including potentially all, of the following:

Conditional usage of subdomains. In an embodiment, the subdomain is only extracted as a feature (e.g., added to the feature string) if the other URL components are empty.

Addition of a "search" keyword when a URL component (e.g., query and parameters) includes a search pattern. In an embodiment, the keyword "search" is extracted as a feature (e.g., added to the feature string) when a URL component comprises a search pattern. For example, for the URL "www.google.com/search?q=ABM", the extracted feature may comprise "'ABM' is being searched". For the URL "www.ptc.com/en/searchresults?q=autocad", the extracted feature may comprise "'autocad' is being searched". (The protocol has been removed in both of these examples and all other examples of URLs in this description to comply with the U.S. Manual of Patent Examining Procedure concerning embedded hyperlinks.) In both examples, the keyword "search" is added to the feature string.

Addition of "company name" keyword when a URL has a homepage pattern. In an embodiment, the keyword "company name" is extracted as a feature (e.g., added to the feature string) when the path is empty. In essence, when the URL components comprise an empty path, subprocess 315 infers that the URL represents the homepage for a company, and therefore, that the domain of the URL represents the name of that company. For example, for the URL "6sense.com/", the keyword "company name" is added to the feature string to reflect that "6sense.com" is a homepage for a company and that the domain includes the name of the company "6sense".

Addition of other keywords based on one or more other heuristic patterns in one or more URL components. The recognition of patterns and the association of patterns with keywords, indicative of those patterns, may be determined empirically over time.

For each activity record, subprocess 320 concatenates all of the URL features extracted from the URL in that activity record, for example, into a feature string or other representation. The feature string may comprise a string of one or more words representing the URL. It should be understood that subprocess 320 generates a set of features for each activity record, such that a plurality of feature sets are generated and each of the plurality of feature sets corresponds to a single activity record in the web data. Table 1 below illustrates some example feature strings that may be output by subprocess 320 for some example URLs in example activity records. (Again, the protocols have been removed from the URLs.)

TABLE 1

| No. | URL (input) | Feature String (output) | Observations |
|---|---|---|---|
| 1 | 6sense.com/ | "company name" | no path |
| 2 | 6sense.com/theRevolution/loginPage.html | "revolution login page" | no query |
| 3 | www.6sense.com/en/theRevolution?q=abm | "revolution abm search" | search pattern |

As discussed above, the web data may comprise a plurality of activity records that each comprises a URL of an online resource that was accessed and metadata associated with that online resource. Whereas subprocess 310 operates on the URL, subprocess 325 operates on the metadata in each of the activity records in the web data. In particular, subprocess 325 pre-processes the metadata. This pre-processing may be identical or similar to the pre-processing described with respect to subprocess 315. For example, the pre-processing steps that were applied to URLs in subprocess 315 may be equally applied (e.g., the same steps in the same sequence) to the metadata in subprocess 325. The only difference is that subprocess 315 applies the pre-processing to the text in URL components, whereas subprocess 325 applies the pre-processing to the text in metadata fields. Accordingly, the description of subprocess 315 applies equally to subprocess 325, and therefore, the pre-processing will not be redundantly described with respect to subprocess 325.

For the metadata in each activity record, after all of the metadata fields have been normalized by subprocess 325, subprocess 330 extracts the metadata features from the normalized metadata fields. The extracted features may be represented collectively as a feature string comprising one or more keywords. The feature extraction may include, without limitation, one or more, including potentially all, of the following:

Excluding duplicate character strings. In an embodiment, duplicate character strings (e.g., phrases, sentences, etc.) in the metadata are excluded from the metadata features, such that only a single instance of each character string is extracted as a metadata feature. For example, the description field in the metadata may contain redundant sentences. In addition, the title field or a portion of the title field may be contained within, and therefore redundant to, the description field. In other words, a redundancy may occur across two or more metadata fields. In this case, only a single instance of the character string is extracted for all of the metadata fields.

Excluding unsupported languages. In some cases, the metadata fields may contain a mixture of languages. In an embodiment, words in an unsupported language (e.g., all non-English words in an implementation in which English is the only supported language) are not extracted as features. It should be understood that one or any plurality of languages, including vernacular languages, may be incorporated in the activity records and supported in the extracted features.

Similarly to subprocess 320, for each activity record, subprocess 330 concatenates all of the metadata features extracted from the metadata in that activity record, for example, into a feature string or other representation. The feature string may comprise a string of one or more words extracted from the metadata. It should be understood that subprocess 330 generates a set of features for each activity record, such that a plurality of feature sets are generated and each of the plurality of feature sets corresponds to a single activity record in the web data. Table 2 below illustrates some example feature strings that may be output by subprocess 330 for some example metadata fields associated, in activity records, with the URLs from Table 1 (cross-referenced by "No." value).

TABLE 2

| No. | Title (A) | Description (B) | Keywords (C) | Output (A + B + C) |
|---|---|---|---|---|
| 1 | The 6sense Account Engagement Platform | achievable predictable revenue growth with the 6sense | {abm, account engagement, platform, revtech} | "account engagement platform achieve predictable revenue growth 6sense abm account engagement platform revtech" |
| 2 | Login to join the revolution | Login to join the revolution | NULL | "login join revolution" |
| 3 | Revenue operations: why it's necessary to win in b2b | Discover the dozens of insights \| [foreign text] | NULL | "revenue operations why necessary win b2b" |

In subprocess 335, for each activity record in the web data, the features that were extracted from the URL in that activity record and the features that were extracted from the metadata in that activity record are concatenated into a final set of features for that activity record. The final set of features for each activity record may comprise a final feature string comprising both the feature string output by subprocess 320 for that activity record and the feature string output by subprocess 330 for that activity record. Table 3 below illustrates some example feature strings that may be output by subprocess 335 for some example activity records comprising the URLs and metadata fields in Tables 1 and 2, respectively (cross-referenced by "No." value).

TABLE 3

| No. | URL Features | Metadata Features | Final Features (A) |
|---|---|---|---|
| 1 | "company name" | "account engagement platform achieve predictable revenue growth 6sense abm account engagement platform revtech" | "company name account engagement platform achieve predictable revenue growth 6sense abm account engagement platform revtech" |
| 2 | "revolution login page" | "login join revolution" | "revolution login page login join revolution" |
| 3 | "revolution abm search" | "revenue operations why necessary win b2b" | "revolution abm search revenue operations why necessary win b2b" |

The output of subprocess 335 is a set of features for each activity record in the web data. Each set of features may be represented as a feature string, as discussed above. Alternatively, each set of features may be represented in another manner, such as, for example, a feature vector or the like. Regardless of the particular feature representation that is used, the features are used to either train a model or obtain predictions from the model. If the model is in training mode (i.e., "Training" for model mode 340), the features are used to train the model starting with subprocess 350. Otherwise, if the model is in operation mode (i.e., "Operation" for model mode 340), the model is applied to the features to produce predictions starting with subprocess 375. It should be understood that the training mode should be executed at least once, in order to train the model with features for a significant number of activity records, prior to deployment of the model into the operation mode.

In an embodiment, the model predicts a class of activity, within a taxonomy, to which each activity record in the web data belongs, based on the features of that activity record. In other words, the features, comprising both URL and metadata features extracted from an activity record, are input into the model, and the model outputs a predicted classification of the activity record into one of a plurality of classes representing a taxonomy. In a particular implementation, the taxonomy comprised the following plurality of classes: "product research;" "blogs;" "company research;" "campaign;" "search;" "case studies;" "solutions;" "whitepaper;" "contact us;" "demo;" "training;" "product trial;" "video;" "webinars;" "support;" "homepage;" "careers;" "conferences/tradeshows;" "pricing;" "communities;" "unsubscribe;" "product research;" "product landing page;" and "other." However, it should be understood that this is just one non-limiting example, and that other combinations of classes may be implemented according to the desired taxonomy. The classes represent the possible activity types, categories, events, and/or the like represented by the activity records, and collectively, represent a taxonomy of web-based activities.

It should be understood that the output of the model may comprise a single class (e.g., the class with the highest probability value) or may comprise a classification vector comprising a probability value for each of the plurality of classes. In an embodiment in which the model outputs a single class, in cases in which no single class can be determined (e.g., no class is associated with a probability value that exceeds a predetermined threshold value, two classes have probability values that are very close, etc.), the model may classify the activity record into a default or "other" class from the plurality of classes or may output a null value.

In subprocess 350, a training dataset is built from the features, output by subprocess 335, for supervised learning of the model. In particular, the set of features extracted from each activity record in the web data may be annotated or labeled with one of the plurality of classes in the desired taxonomy, to produce an annotated training dataset. In other words, the training dataset comprises sets of features that have each been annotated with a ground-truth class from the plurality of classes. In a particular implementation the training dataset comprised approximately 5,000 data points (i.e., annotated features) for each of the plurality of classes. The web data, from which the training dataset was derived, were collected from forty distinct user accounts.

The features for each activity record may be annotated manually by a human reviewing the features for each activity record. In some cases, the ground-truth classification may be evident (e.g., the class name is present in the URL or metadata). However, even in these cases, ambiguity may need to be addressed. For example, the URL "6sense.com/webinars/video talks.mp4" could be classified as either a "video" or "webinars," since both class names are present in the URL. In this particular case, the more accurate classification would be "webinars."

In subprocess 355, the training dataset, built in subprocess 350, is used to train the model. The model may comprise a machine-learning algorithm. For example, in an embodiment, the model comprises a neural network with an input layer that accepts a set of features for an activity record as an input, one or more hidden layers that transform the input, and an output layer that outputs the predicted one of the plurality of classes or the probability value for each of the plurality of classes. The neural network may be a deep neural network comprising a plurality of hidden layers. In a particular implementation, the neural network may be a recurrent neural network (RNN), with long short-term memory (LSTM). LSTM uses feedback connections to process sequences of data, such as sentences. The neural network may comprise a rectified linear activation unit (ReLU) as the activation function for one or more, including potentially all, of the hidden layers, and may comprise the softmax function as the last activation function for the final classification. A 20% dropout may be used for each layer during training to reduce overfitting and improve generalization error.

Figure 5:
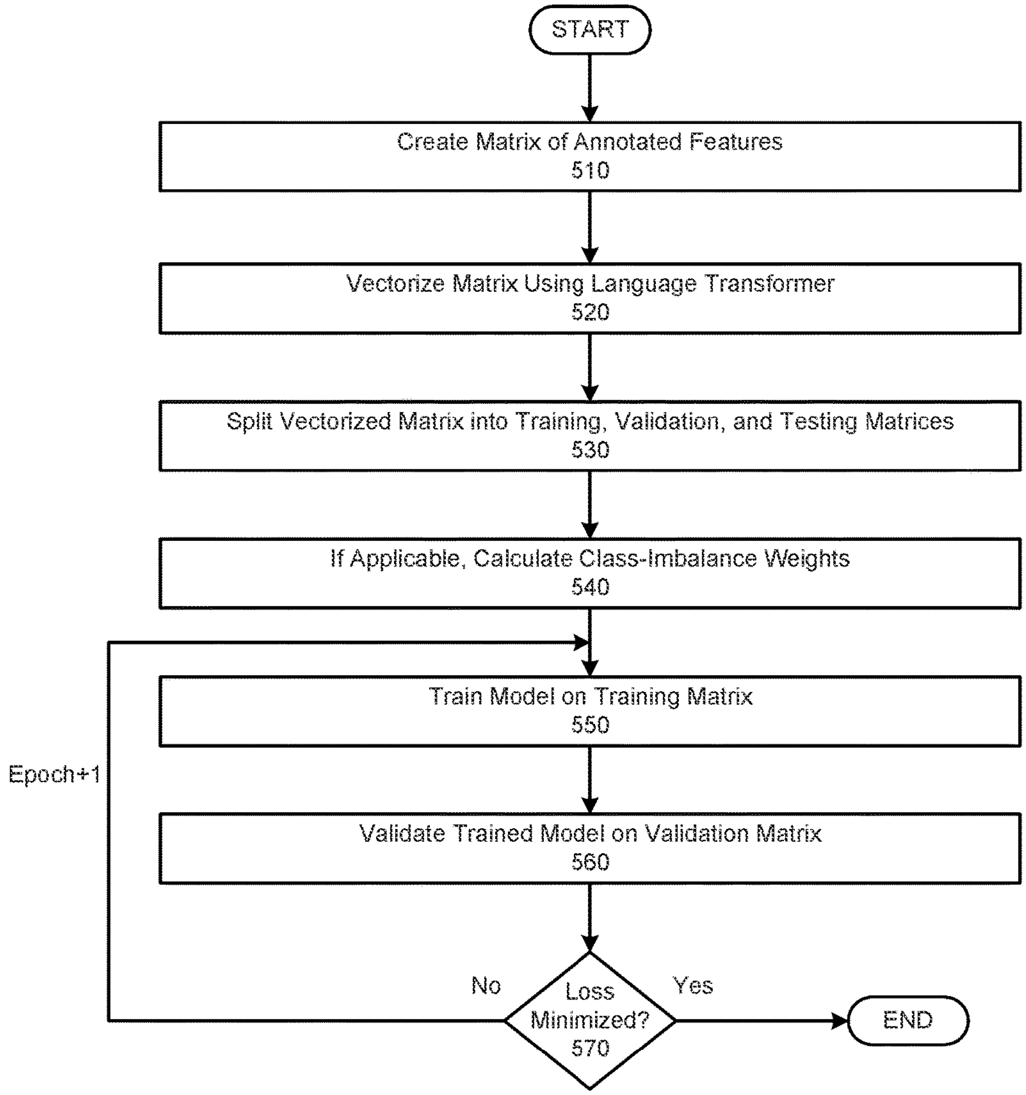
FIG. 5 illustrates an example process for training a model, according to an embodiment.

FIG. 5 illustrates an example of subprocess 355 in process 300, according to an embodiment. In subprocess 510, a matrix of the annotated features in the training dataset is created. This matrix may be defined in terms of the mathematical variables X and Y, in which X is the independent variable and Y is the dependent variable. In this case, X represents the final feature sets (e.g., exemplified in Table 3 as a feature string), and Y represents the annotations of ground-truth classes for the final feature sets. Each annotation of a class may be represented as an integer that uniquely identifies the class within the plurality of possible classes (e.g., "product research" represented as "0", "blogs" represented as "1", "company research" represented as "2", and so on).

In subprocess 520, the matrix, created in subprocess 510, is vectorized. Vectorization is performed to enable computers and models to more easily process text at a low level. In an embodiment of the vectorization in subprocess 520, each feature string in the matrix is converted into a fixed-dimensional vector according to a vector space model for producing textual embeddings. In particular, a feature string $X_i$ is input into a vectorization function $F_V$ that outputs an N-dimensional vector $V_i$ (i.e., $F_V(X_i)=V_i$). For example:

$$F_V(\text{"Today is a good day!"})=[V_i^1,V_i^2,V_i^3, \ldots ,V_i^N]=[0.435,-1.923,-0.553, \ldots ,0.123]$$

The output of subprocess 520 is an N-dimensional vector $V_i$ for each of the annotated sets of features in the training dataset. It should be understood that N is the number of dimensions in the particular vector space being used for vectorization function $F_V$. Each of the N-dimensional vectors $V_i$ is annotated with the ground-truth class $Y_i$ that corresponds to the feature string $X_i$ from which the vector feature string $V_i$ was derived to form a vectorized matrix.

The choice of vectorization function $F_V$ depends on the nature and complexity of the problem. In an embodiment, a language transformer is used as the vectorization function $F_V$, such as the Universal Sentence Encoder by Google LLC of Mountain View, California A language transformer is a deep-learning model that accepts a natural-language sentence as input and outputs an N-dimensional real-valued vector representing the position of the sentence in an N-dimensional vector space. In particular, each output vector encodes the meaning of the input sentence, such that sentences whose vectors are closer to each other in the N-dimensional vector space are more similar in meaning than sentences whose vectors are farther from each other in the N-dimensional vector space. In the case of the Universal Sentence Encoder, N=512, such that each output vector consists of 512 real values. It should be understood that this is only one non-limiting example, and that other models may be used for vectorization function $F_V$.

In subprocess 530, the vectorized matrix is split into three parts, comprising a training matrix, a validation matrix, and a testing matrix. It should be understood that each of these three matrices comprises a separate and distinct portion of the annotated vectors ($V_i$, $Y_i$), output by subprocess 520, and, collectively, may comprise the entire set of annotated vectors output by subprocess 520. The ratio of the sizes of the three matrices may depend on the problem and data. In a particular implementation, the ratio was 7:1:2, with a distinct set of 70% of the annotated vectors included in the training matrix, a distinct set of 10% of the annotated vectors included in the validation matrix, and a distinct set of 20% of the annotated vectors included in the testing matrix.

Ideally, the training matrix should contain an equal distribution of annotated vectors for all of the plurality of classes. If the model is trained on an unequal distribution of annotated vectors, the model may learn to be biased towards classes with higher distributions. However, depending on how the split is performed in subprocess 530, the training matrix may not contain an even distribution of annotated vectors, or "data points," for all of the plurality of classes. In an embodiment in which the data points are evenly distributed in the vectorized matrix, before the split in subprocess 530, the vectorized matrix may be split into the training matrix, validation matrix, and testing matrix so that the data points are evenly distributed in at least the training matrix. In this case, subprocess 540 may be omitted.

Otherwise, in subprocess 540, a class-imbalance weight may be calculated for each class in the plurality of classes. For example, the class-imbalance weight $w_j$ for a given class j may be calculated as $n_{max}/n_j$, wherein $n_{max}$ is the number of data points in the training matrix for the class with the maximum number of data points, and $n_j$ is the number of data points in the training matrix for the given class j. In this case, the ideal weight $w_j$ for each class j is 1.0. In other words, if all classes have a class-imbalance weight w=1.0, then the training dataset is perfectly homogenous. In the event that the training dataset is not perfectly homogeneous, the weights $w_j$ are used to balance the model, so that the model is not biased towards classes with more data points in the training dataset. In other words, the model is trained equally on each of the plurality of classes. Table 4 below illustrates example class-imbalance weights for a subset of example classes, according to a particular implementation.

TABLE 4

| j | Class Name | No. of Data Points | Class-Imbalance Weight ($w_j$) |
|---|---|---|---|
| 0 | Product Research | 100 | 1.0 |
| 1 | Blogs | 50 | 0.5 |
| 3 | Video | 20 | 0.2 |
| 4 | Campaign | 80 | 0.8 |
| 2 | Company Research | 90 | 0.9 |
| . . . | . . . | . . . | . . . |

In subprocess 550, the model is trained on the training matrix. In an embodiment, the weights of a neural network, such as a deep neural network, are trained using the annotated vectors in the training matrix to minimize a loss function. In particular, the deep neural network is trained to classify features of web data, comprising both URL and metadata features, into one of the plurality of classes of the taxonomy. Thus, the trained deep neural network represents a deep-learning-based classifier. Since there are a plurality of classes to be predicted by the model, the parameters of the model may be initialized in a multiclass configuration. Multiclass configuration refers to the problem of classifying instances into one of three or more classes.

In an embodiment, transfer learning is used to facilitate the training in subprocess 550. In transfer learning, an existing model is used as a starting point or source for training the new model. The existing model may have been previously trained to solve a different or similar problem. In this case, the existing model may have been previously trained for natural language processing. In particular, the neuron weights of a neural network that have been trained for natural language processing may be used as the starting point for training the deep-learning-based classifier.

In an embodiment, a language transformer is used as the source of transfer learning. In particular, the neuron weights for the base architecture of the trained neural network for an existing language transformer, such as Bidirectional Encoder Representations from Transformers (BERT), may be frozen. BERT is described in "Attention Is All You Need," by Vaswani et al., 31st Conference on Neural Information Processing Systems (NIPS 2017), arXiv: 1706.03762v5, which is hereby incorporated herein by reference as if set forth in full. Then, one or more, and typically several, subsequent layers are added to this base architecture to build a deep neural network that is able to classify language into the plurality of specific classes. This process is referred to as "fine-tuning." One advantage of fine-tuning a language transformer to build the model is that the layers of a language transformer hold information about natural language understanding and sentence interpretation, which abstracts the process of breaking sentences into phrases, words, or characters. Hence, this base architecture is able to interpret the input. In addition, transfer learning enables the model to be trained with a fewer number of data points, because the language understanding has already been addressed by the base architecture of the existing model. There only needs to be a sufficient number of data points to train the end layers of the neural network to classify the understood language into the specific classes developed for the particular application.

The goal of training is to minimize the error between the ground-truth classes (e.g., the annotations) and the predicted classes (i.e., output by the model). If a predicted class matches the ground-truth class, then the error is minimized for that prediction. The total error of the model may be determined according to a loss function, such that the goal of training is to minimize the loss function. The loss function may be minimized when the an error metric computed by the loss function is below a predetermined threshold value, representing a necessary or desired accuracy of the model, or the difference or rate of decrease in the error metric from prior epochs falls below a predetermined threshold value, representing that the loss function cannot be minimized any further. In an embodiment, a cross-entropy loss function may be used as the loss function, along with the Adam optimizer. The training may be performed, for example, using Pytorch or Tensorflow.

Following an iteration or "epoch" of training in subprocess 550, the trained model is validated on the validation matrix in subprocess 560. In other words, the trained model is applied to the feature vectors in the validation matrix as inputs, to produce predicted classes for each of the feature vectors as outputs. In subprocess 570, the loss function is computed, representing the error between the predicted classes for the feature vectors in the validation matrix and their corresponding ground-truth classes, represented by the annotations of the feature vectors in the validation matrix. If the loss function is minimized (i.e., "Yes" in subprocess 570), subprocess 355 ends. Otherwise, if the loss function is not minimized (i.e., "No" in subprocess 570), another epoch of training is performed in subprocess 550. In other words, the model is retrained (e.g., by updating neuron weights of the neural network) on the training matrix in subprocess 550, and then revalidated in subprocess 560. Subprocesses 550 and 560 may iterate over a plurality of epochs until the loss function is minimized (e.g., additional iterations are no longer able to reduce the error metric, such that a “Yes” determination is reached in subprocess 570). In a particular implementation, this training process was performed on a GPU, and took as long as three hours to minimize the loss function.

Returning to FIG. 3, in subprocess 360, the trained and validated model may be evaluated. In particular, the model may be evaluated on the testing matrix that was produced by the split in subprocess 530. It should be understood that the testing matrix has not yet been processed by the model, since it was not used during training in subprocess 355. The goal of subprocess 360 is to determine whether the model is suitable for operation. Subprocess 360 may be performed manually by a data scientist.

The evaluation, in subprocess 360, may utilize a metric of the model’s accuracy to determine whether or not the model passes the evaluation. For example, if the metric satisfies (e.g., exceeds) a predetermined threshold value, the model may be determined to pass the evaluation (i.e., “Yes” in subprocess 365). Otherwise, if the metric does not satisfy the predetermined threshold value, the model may be determined to not pass the evaluation (i.e., “No” in subprocess 365).

In a particular implementation, the multiclass F1-score was used as the metric of the model’s accuracy. The F1-score is a function of precision (a.k.a., positive predictive value) and recall (a.k.a., sensitivity). Precision is the number of true positive results divided by the number of all positive results for a particular class, and recall is the number of true positive results divided by the number of all data points that have should have been identified as positive for a particular class. The multiclass F1-score is calculated by combining the F1-scores for each of the classes, according to a combination strategy (e.g., micro-average, macro-average, weighted average, etc.). Table 5 below illustrates an example evaluation, using the multiclass F1-score, for a set of example classes, according to a particular implementation. As depicted, the model of this particular implementation had a multiclass F1-score of 0.76, which may be considered sufficient to pass the evaluation (e.g., based on a threshold of 0.75).

TABLE 5

| Class | Precision | Recall | F1-Score | Data Points |
|---|---|---|---|---|
| blogs | 0.81 | 0.79 | 0.80 | 4,054 |
| careers | 0.92 | 0.99 | 0.95 | 1,181 |
| case studies | 0.76 | 0.87 | 0.81 | 1,580 |
| chat | 0.89 | 0.40 | 0.56 | 647 |
| communities | 0.39 | 0.69 | 0.50 | 695 |
| company research | 0.83 | 0.74 | 0.79 | 4,165 |
| conferences/tradeshows | 0.72 | 0.82 | 0.77 | 1,349 |
| contact us | 0.62 | 0.84 | 0.72 | 1,673 |
| demo | 0.91 | 0.82 | 0.87 | 1,972 |
| home page | 0.89 | 0.93 | 0.91 | 4,567 |
| login page | 0.79 | 0.85 | 0.82 | 1,142 |
| other | 0.73 | 0.54 | 0.62 | 9,009 |
| pricing | 0.81 | 0.76 | 0.79 | 1,488 |
| product trial | 0.63 | 0.75 | 0.68 | 1,589 |
| product research | 0.89 | 0.93 | 0.91 | 4,567 |
| search | 0.92 | 0.80 | 0.85 | 2,231 |
| solutions | 0.60 | 0.80 | 0.69 | 1,946 |
| support | 0.70 | 0.77 | 0.73 | 1,447 |

TABLE 5-continued

| Class | Precision | Recall | F1-Score | Data Points |
|---|---|---|---|---|
| training | 0.82 | 0.78 | 0.80 | 2,343 |
| unsubscribe | 0.99 | 0.73 | 0.84 | 717 |
| webinars | 0.75 | 0.94 | 0.83 | 1,247 |
| white paper | 0.56 | 0.71 | 0.63 | 2,641 |
| datasheet | 0.91 | 0.82 | 0.87 | 1,972 |
| campaign | 0.72 | 0.82 | 0.77 | 4,567 |
| video | 0.89 | 0.40 | 0.56 | 647 |
| Totals | | | | |
| accuracy | | | 0.76 | 59,436 |
| macro average | 0.77 | 0.77 | 0.76 | 59,436 |
| weighted average | 0.78 | 0.76 | 0.76 | 59,436 |

If the model does not pass the evaluation (i.e., “No” in subprocess 365), process 300 may return to subprocess 350 to build a new training dataset. In some cases, building a new training dataset from features in the same web data may not be sufficient. In this case, subprocess 300 may return to subprocess 305 to obtain new web data.

If the model passes the evaluation (i.e., “Yes” in subprocess 365), the model and its associated parameters (e.g., neuron weights) may be saved in subprocess 370. In particular, the model and its associated parameters may be saved on platform 110, which may comprise a cloud server, for deployment into the operation mode. The model may be saved to a shared path in memory (e.g., database 114) for utilization during the operation mode.

Prior to being saved, the model may be streamlined or optimized for performance. For example, in a particular implementation, the model was passed through the Open Neural Network Exchange (ONNX) runtime, which converts the native model into a different format to improve the speed of prediction (e.g., decreasing prediction times by as much as ten times, and by 3.1 times on average). Advantageously, this enabled the model to be operated on a standard CPU during the operation phase, such that a GPU was unnecessary during the operation phase and the model was more portable. Notably, this conversion process only affects how the model is represented. It does not affect the accuracy of the model and may be omitted in other implementations.

In the operation mode of the model, the model and its associated parameters are loaded in subprocess 375. For example, the model may be loaded from memory (e.g., database 114) on platform 110, which may comprise a cloud server, and configured according to its associated parameters (if necessary). A reference (e.g., path) to the configured model may then be provided to subsequent subprocesses for application of the loaded model.

In subprocess 380, the loaded model is applied to the set of features, including concatenated URL and metadata features, output by subprocess 335, for each activity record in the web data. It should be understood that, in the operation mode, these features are unannotated. Prior to input into the model, each set of features may be vectorized in an identical manner as in subprocess 520. In particular, a feature string $X_i$ may be input into a vectorization function $F_V$ that outputs an N-dimensional feature vector $V_i$ (i.e., $F_V(X_i)=V_i$), which may comprise N real values. In other words, the format of the input to the model during training should be identical to the format of the input to the model during operation.

In an embodiment, the model is probabilistic, as opposed to heuristic. Thus, for each feature vector, the model may output both the predicted class and a probability value of the predicted class for the feature vector. The probability value represents a confidence that the predicted class is correct. In an embodiment, the model outputs a probability vector that comprises a probability value for each of the plurality of classes. In this case, the size of the probability vector is the same as the number of classes in the taxonomy, and the probability values in a given probability vector may sum to 1.0. In an alternative embodiment, the model may simply output the class with the highest probability value as the predicted class, along with that highest probability value.

In subprocess 385, the predictions output by the model in subprocess 380 may be post-processed. In particular, each prediction may be analyzed to determine whether or not that prediction should be accepted and/or how that prediction should be characterized. Each prediction may be characterized in binary terms, as either confident or non-confident. Subprocess 385 may comprise determining whether or not the probability value for the predicted class with the highest probability value satisfies (e.g., exceeds) a predetermined threshold value. If the prediction satisfies the predetermined threshold, the prediction may be characterized as confident. Otherwise, if the prediction does not satisfy the predetermined threshold, the prediction may be characterized as non-confident. The value of the predetermined threshold may be determined during training in subprocess 360 based on the variation in predicted classes and their corresponding probability values during evaluation.

In an embodiment, if the prediction satisfies the predetermined threshold, the prediction is associated with a status of "mapped." Otherwise, if the prediction does not satisfy the predetermined threshold, the prediction may be associated with a status of "unmapped." In addition, in an embodiment, if a prediction comprises two classes with very close probability values (e.g., within 1-3 percentage points, such as a first class with a probability value of 0.51 and a second class with a probability value of 0.49), the prediction may be associated with a status of "unmapped," even if it satisfies the predetermined threshold. In such cases, simply selecting the predicted class with the highest probability value may frequently result in unreliable classifications. In any case in which the prediction is given the status of "unmapped," the predicted class may be automatically overridden to null or a null class, to thereby negate the model's prediction.

In optional subprocess 390, one or more of the classifications may be confirmed, overridden, and/or manually specified for a given activity record. For example, in an embodiment, the classifications of all predictions that have been assigned the status of "unmapped" may be provided to a user, via a graphical user interface (e.g., of the user's user account), for manual classification via one or more inputs of the graphical user interface. The graphical user interface may also comprise one or more inputs for manually confirming and/or overriding the classifications of predictions that have been assigned the status of "mapped." For example, the graphical user interface may provide, for each of the "mapped" and "unmapped" statuses, a list of all activity records or all unique URLs in the activity records to which the user has access. The user may select individual entries in the list, and, in response to the selection of an entry in the list, the graphical user interface may provide details about the entry and one or more inputs (e.g., a drop-down menu) for changing or specifying the class to which the entry belongs and, optionally, for changing the status of the entry, for example, between "mapped" (e.g., if currently classified) or "unmapped" (e.g., if currently unclassified) and "do not map." In the case of entries, corresponding to activities or URLs with the status of "mapped," the input for changing the class may be pre-populated with the predicted class for that entry. Similarly, an input for changing the status of the entry may be pre-populated with the current status for that entry. Thus, the graphical user interface makes it easy for users to identify and rectify any classification mistakes.

The user may utilize the graphical user interface to perform, without limitation, one or more of the following actions on each activity record or URL:

- Override the predicted class with any other one of the plurality of classes, irrespective of the status (e.g., "mapped" or "unmapped").
- Change the status from "mapped" or "unmapped" to "do not map," or vice versa. The "do not map" status indicates that the user intends to discard or ignore the activity record or URL. Thus, an activity record or URL with a "do not map" status is not propagated to subprocess 395.
- Change the status from "unmapped" to "mapped," or vice versa.
- In an embodiment, the statuses include a "mapped but needs confirmation" status. This status indicates that explicit attention by the user is requested. The "mapped but needs confirmation" status may be assigned to activity records for which the highest probability value is very close to the second highest probability value (e.g., within 1 to 3 percentage points), such that the predicted class may be unreliable. The user may review each activity record with a "mapped but needs confirmation status" and confirm or change the class associated with that activity record. Once the user confirms or changes the class, the status of the activity record may be automatically updated to "mapped."

Figure 6A:
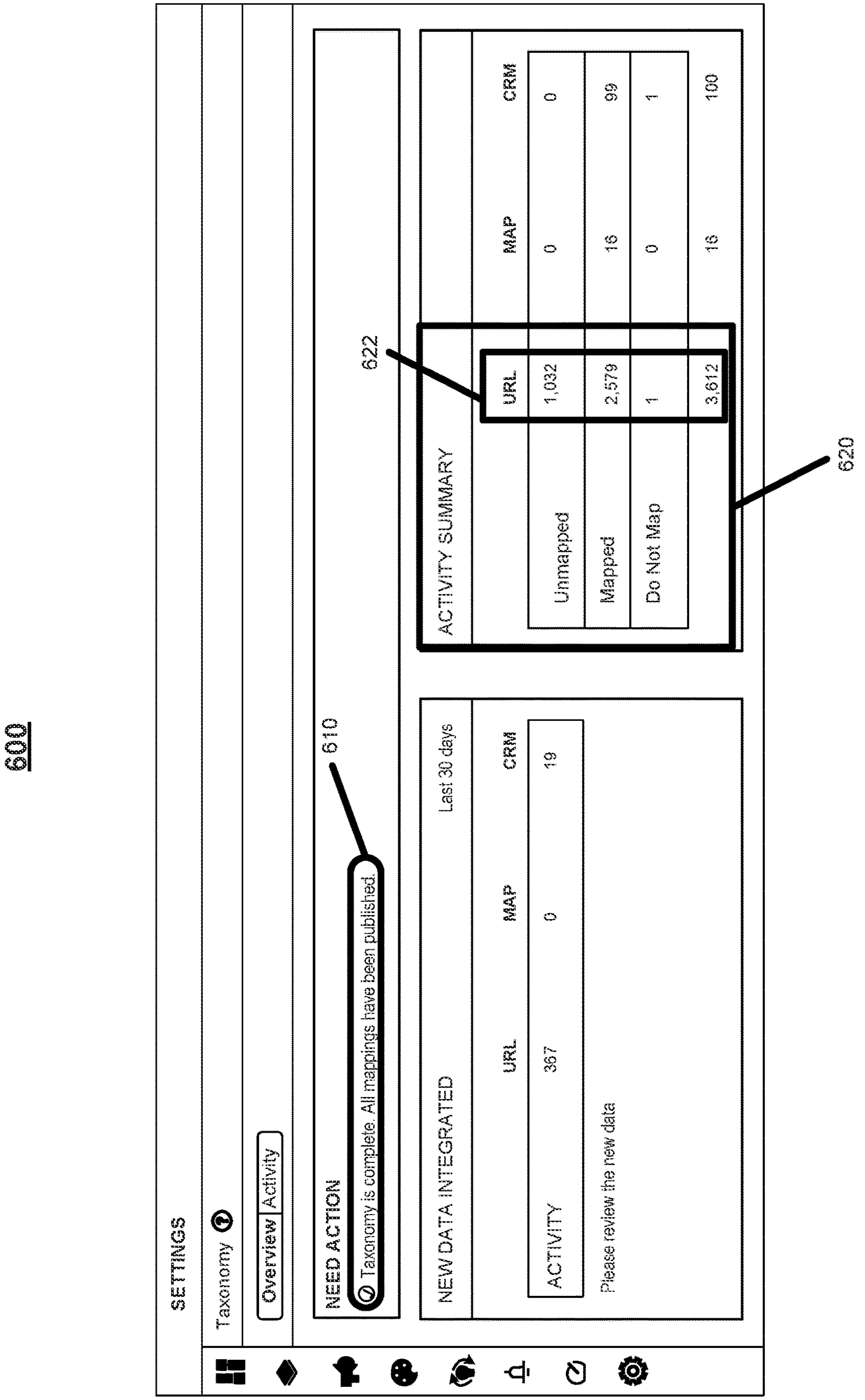
FIGS. 6A and 6B illustrate exemplary screens of a graphical user interface, according to an embodiment.
Figure 6B:
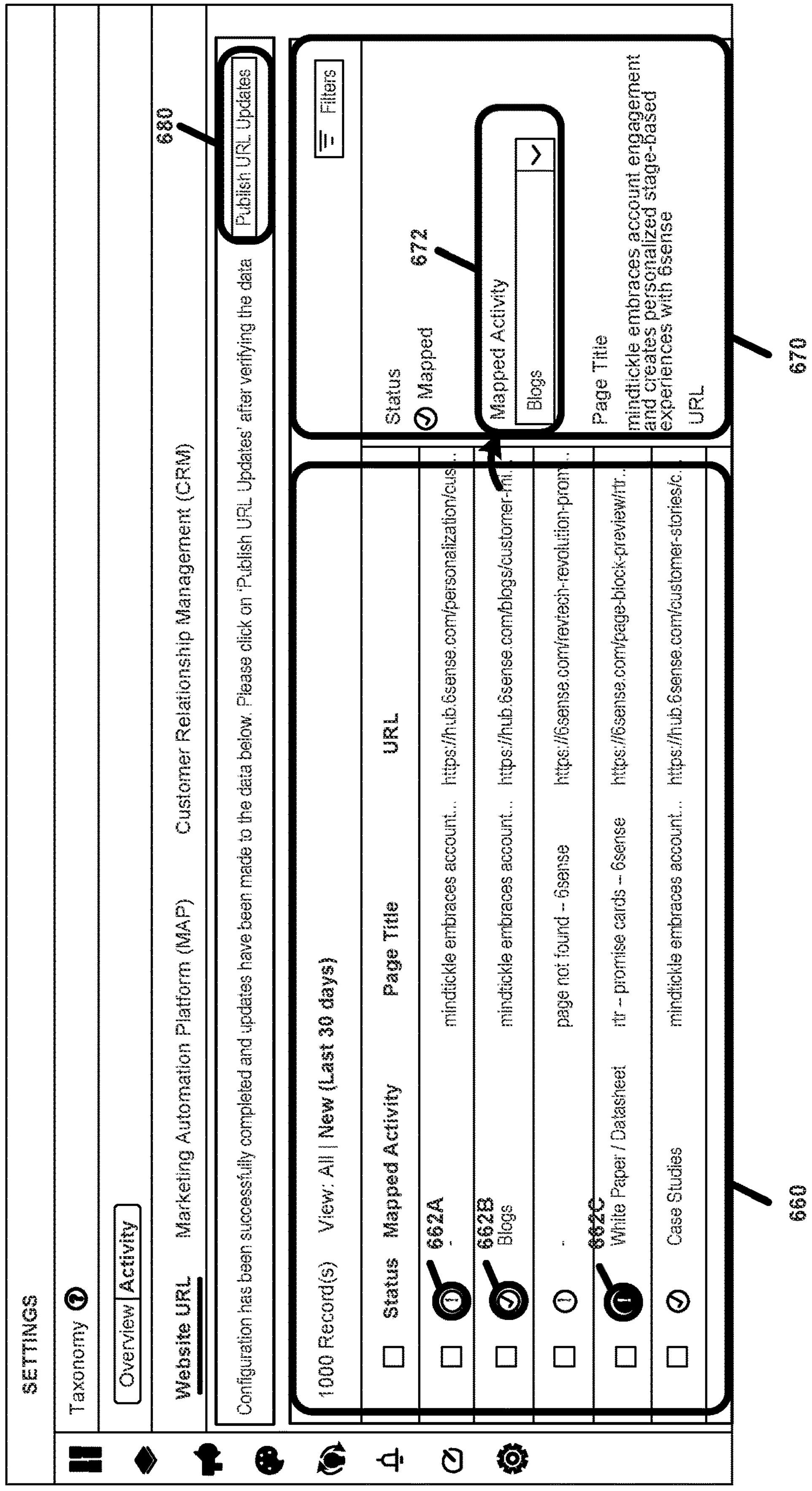

FIGS. 6A and 6B illustrate an exemplary overview screen 600 and activity screen 650, respectively, of a graphical user interface, via which predicted classes for activity records may be viewed, confirmed, specified, and/or overridden, according to an embodiment. Overview screen 600 may comprise an informational area 610 that notifies the user whether or not there are any action items that need to be addressed. Overview screen 600 may also comprise an activity summary 620 that includes a URL summary 622 that indicates the number of data points with each status (e.g., "mapped," "unmapped," and "do not map").

Activity screen 650 may comprise a list 660 of activity records or URLs. List 660 may be filterable (e.g., so that a user may view all entries, entries from the past month, etc.) and/or sortable (e.g., by one or more of the columns of the list). It should be understood that, depending on the number of entries in list 660 and/or user preference settings, list 600 may be paginated according to a maximum number of entries per page. Each entry in list 660 may comprise a checkbox (e.g., for selecting the entry), a status, a title associated with the URL indicated in the activity record that is represented by the entry, and/or the URL itself. The status may be represented by an icon 662. For example, in the illustrated embodiment, icon 662A indicates a status of "unmapped," icon 662B indicates a status of "mapped," and icon 662C indicates a status of "mapped but needs confirmation."

Each entry in list 660 may be selectable. When a user selects an entry, the graphical user interface may populate a frame 670 with details about the activity record or URL represented by the selected entry. These details may comprise the status of the class (e.g., "mapped," "unmapped," "mapped but needs confirmation," or "do not map"), an input 672 for selecting the class from the plurality of classes, the title associated with the URL, the URL itself, and/or the like. Input 672 may comprise a drop-down menu that comprises a selectable identifier for all of the plurality of classes. Thus, a user may change the class that is associated with the activity record or URL as needed or desired. When the user is done updating entries in list 660 (e.g., confirming classes, changing classes, overriding classes, etc.), the user may select a "publish" input 680 for publishing the updates to the data warehouse (e.g., in database 114 of platform 110).

In subprocess 395, the post-processed predictions are saved to the data warehouse. In addition, any confirmations and/or overrides are saved with the predictions to the data warehouse. In an embodiment, the predictions may be stored outside the data warehouse until a user publishes them (e.g., by selecting input 680). Thus, a user may review, confirm, and/or override predicted classes before the activity records or URLs, with their associated classes, are saved to the data warehouse. It should be understood that some of the activity records or URLs may be discarded without being saved to the data warehouse (e.g., those associated with the "do not map" status).

In an embodiment, one or more, including potentially all, of the saved associations between URLs and classes may be incorporated into a lookup table (e.g., in database 114 of platform 110). The lookup table may be indexed according to URL, so that previously predicted or user-specified classes can be easily retrieved based on the URL. In such an embodiment, when an activity record is received in the operation phase, a lookup may be performed using the URL in the activity record, before extracting any features or applying the model to those extracted features (e.g., between subprocesses 305 and 310). If the lookup returns a class, the activity record may be associated with that class without performing any subsequent processing for the activity record. This increases the efficiency of process 300 by not requiring application of the model when the same URL has already been seen and classified, and by propagating any user-specified classes (e.g., specified when an activity record could not be reliably classified or as an override of a predicted class) to future encounters with a previously seen URL.

Once saved in the data warehouse, the activity records or URLs may be used for one or more downstream functions, such as predicting buyer intent and buying stages for visitors represented by the activity records, as discussed in greater detail in the related patent applications. For example, once assigned to the activity records, the various classes in the taxonomy can be used to weight activities, represented by the activity records, for a sales prediction algorithm and/or intent model. In this case, some classes of activities in the taxonomy, which are more indicative of a future purchase or certain buying stage, may be weighted higher than other classes of activities in the taxonomy, which are less indicative of a future purchase or certain buying stage. As an example, an activity of a website visitor that is classified as "pricing" is more indicative of a future purchase than an activity of a website visitor that is classified as "home page," and therefore, should be weighted higher in an algorithm that predicts the likelihood that the visitor is about to make a purchase. Advantageously, the disclosed model imbues a computer with the artificial intelligence to interpret activities, and enables the computer to understand how those activities may influence buying decisions.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

Combinations, described herein, such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, and any such combination may contain one or more members of its constituents A, B, and/or C. For example, a combination of A and B may comprise one A and multiple B's, multiple A's and one B, or multiple A's and multiple B's.

What is claimed is:

1. A method comprising using at least one hardware processor to:

- during a training mode, train a model to predict a class, from a plurality of classes in a taxonomy of web-based activities, based on a training dataset that comprises a plurality of annotated features, wherein each of the plurality of annotated features comprises one or more features, which have been derived from a uniform resource locator (URL) of an online resource and metadata associated with that online resource, and a ground-truth class assigned to those one or more features; and,
- during an operation mode,
  - acquire web data comprising one or more activity records, wherein each of the one or more activity records comprises a URL of an online resource that was accessed by a visitor, and metadata associated with that online resource, and,
  - for each of the one or more activity records,
    - extract a set of one or more features from the URL and the metadata in the activity record,
    - apply the trained model to the set of one or more features to predict a class, from the plurality of classes in the taxonomy, that is associated with the set of one or more features, and
    - store the predicted class in association with the URL in the activity record.

2. The method of claim 1, wherein extracting a set of one or more features from the URL and the metadata comprises:

- deriving one or more keywords from the URL and the metadata; and
- converting the one or more keywords into a vector according to a vectorization function.

3. The method of claim 2, wherein the vector has a fixed number of dimensions and represents an embedding of the one or more keywords within a vector space having the fixed number of dimensions.

4. The method of claim 3, wherein the vectorization function is a language transformer.

5. The method of claim 3, wherein the vector comprises a real value for each of the fixed number of dimensions.

6. The method of claim 1, wherein extracting a set of one or more features from the URL comprises:

parsing the URL into a plurality of components; and
deriving one or more keywords to be included in the set of one or more features based on at least one pattern in the plurality of components.

7. The method of claim 6, wherein extracting a set of one or more features from the URL further comprises, after parsing the URL and before deriving one or more keywords, pre-processing the plurality of components to normalize text in the plurality of components.

8. The method of claim 6, wherein deriving one or more keywords to be included in the set of one or more features comprises adding a sub domain in the plurality of components to the set of one or more features only when one or more other ones of the plurality of components are empty.

9. The method of claim 6, wherein deriving one or more keywords to be included in the set of one or more features comprises adding a keyword indicating a search to the set of one or more features when a search pattern is present in the plurality of components.

10. The method of claim 6, wherein deriving one or more keywords to be included in the set of one or more features comprises adding a keyword indicating a company name to the set of one or more features when a homepage pattern is present in the plurality of components.

11. The method of claim 1, wherein extracting a set of one or more features from the metadata comprises extracting character strings from one or more fields in the metadata without including duplicate character strings in the set of one or more features.

12. The method of claim 1, wherein the model comprises a deep neural network.

13. The method of claim 12, wherein training the model comprises adding one or more layers to an existing neural network trained for natural language processing, while neuron weights in one or more layers of the existing neural network are frozen.

14. The method of claim 12, wherein the trained model outputs both the predicted class and a probability value for the predicted class, and wherein the method further comprises using the at least one hardware processor to, during the operation mode, for each of the one or more activity records:

when the probability value for the predicted class satisfies a threshold, assign a mapped status to the URL in the activity record; and,
when the probability value for the predicted class does not satisfy the threshold, assign an unmapped status to the URL in the activity record.

15. The method of claim 14, wherein the method further comprises using the at least one hardware processor to:

generate a graphical user interface that comprises, for each of the URLs to which the unmapped status has been assigned, one or more inputs for specifying one of the plurality of classes in the taxonomy to be associated with that URL; and,
in response to receiving a specification of one of the plurality of classes in the taxonomy to be associated with one of the URLs to which the unmapped status has been assigned, store the specified class in association with the one URL, and switch the unmapped status to the mapped status.

16. The method of claim 1, wherein the method further comprises using the at least one hardware processor to generate a graphical user interface that comprises one or more inputs for changing any one or more of the stored predicted classes that are associated with the URLs in the activity records to overriding classes, and at least one input for storing any overriding classes and any non-overridden predicted classes in association with their respective URLs in a data warehouse.

17. The method of claim 16, further comprising using the at least one hardware processor to generate a lookup table from the data warehouse, wherein the lookup table indexes classes in the data warehouse by URLs associated with those classes in the data warehouse.

18. The method of claim 17, further comprising using the at least one hardware processor to, for each of the one or more activity records:

prior to extracting the set of one or more features, perform a lookup in the lookup table using the URL in the activity record;
when the lookup returns a class, store the class in association with the URL in the activity record without extracting the set of one or more features and without applying the trained model; and,
when the lookup does not return a class, extract the set of one or more features and apply the trained model.

19. A system comprising:

at least one hardware processor; and
one or more software modules that are configured to, when executed by the at least one hardware processor,
during a training mode, train a model to predict a class, from a plurality of classes in a taxonomy of web-based activities, based on a training dataset that comprises a plurality of annotated features, wherein each of the plurality of annotated features comprises one or more features, which have been derived from a uniform resource locator (URL) of an online resource and metadata associated with that online resource, and a ground-truth class assigned to those one or more features, and,
during an operation mode,
acquire web data comprising one or more activity records, wherein each of the one or more activity records comprises a URL of an online resource that was accessed by a visitor, and metadata associated with that online resource, and,
for each of the one or more activity records,
extract a set of one or more features from the URL and the metadata in the activity record,
apply the trained model to the set of one or more features to predict a class, from the plurality of classes in the taxonomy, that is associated with the set of one or more features, and
store the predicted class in association with the URL in the activity record.

20. A non-transitory computer-readable medium having instructions stored therein, wherein the instructions, when executed by a processor, cause the processor to:

during a training mode, train a model to predict a class, from a plurality of classes in a taxonomy of web-based activities, based on a training dataset that comprises a plurality of annotated features, wherein each of the plurality of annotated features comprises one or more features, which have been derived from a uniform resource locator (URL) of an online resource and metadata associated with that online resource, and a ground-truth class assigned to those one or more features; and,
during an operation mode,
acquire web data comprising one or more activity records, wherein each of the one or more activity records comprises a URL of an online resource that was accessed by a visitor, and metadata associated with that online resource, and, for each of the one or more activity records, extract a set of one or more features from the URL and the metadata in the activity record, apply the trained model to the set of one or more features to predict a class, from the plurality of classes in the taxonomy, that is associated with the set of one or more features, and store the predicted class in association with the URL in the activity record.

* * * * *